of the water. Letters B B indicate suitable

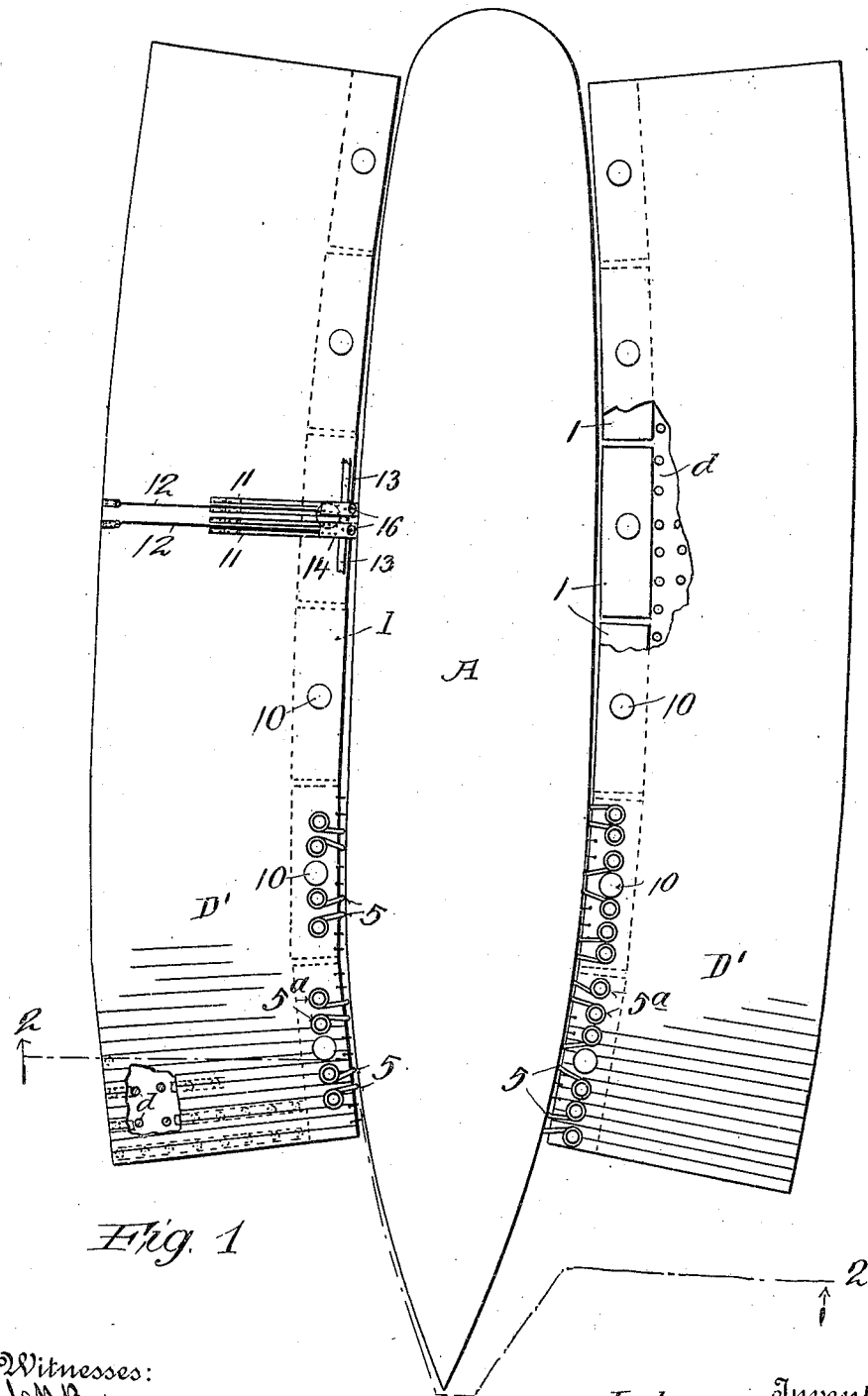

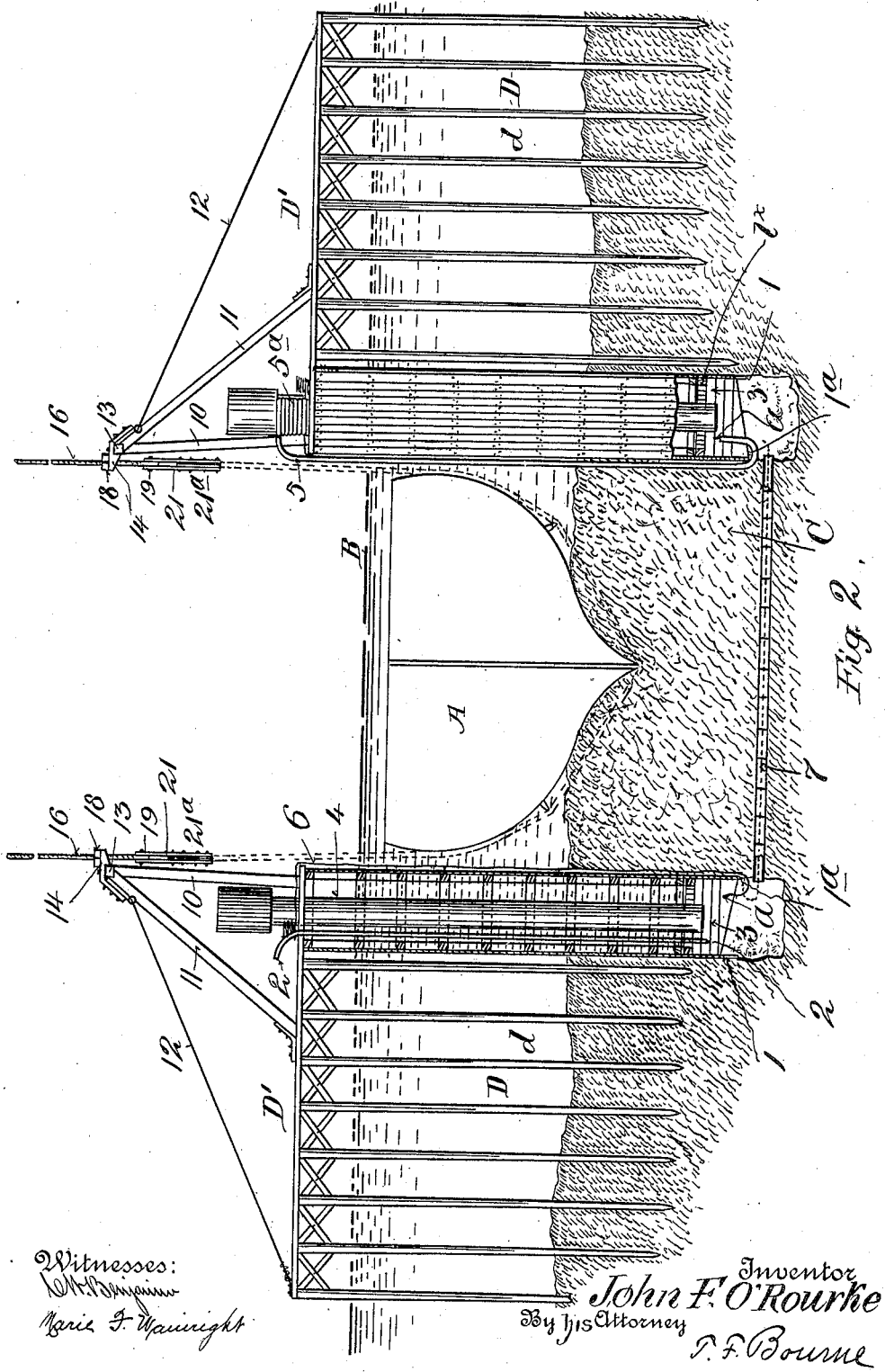

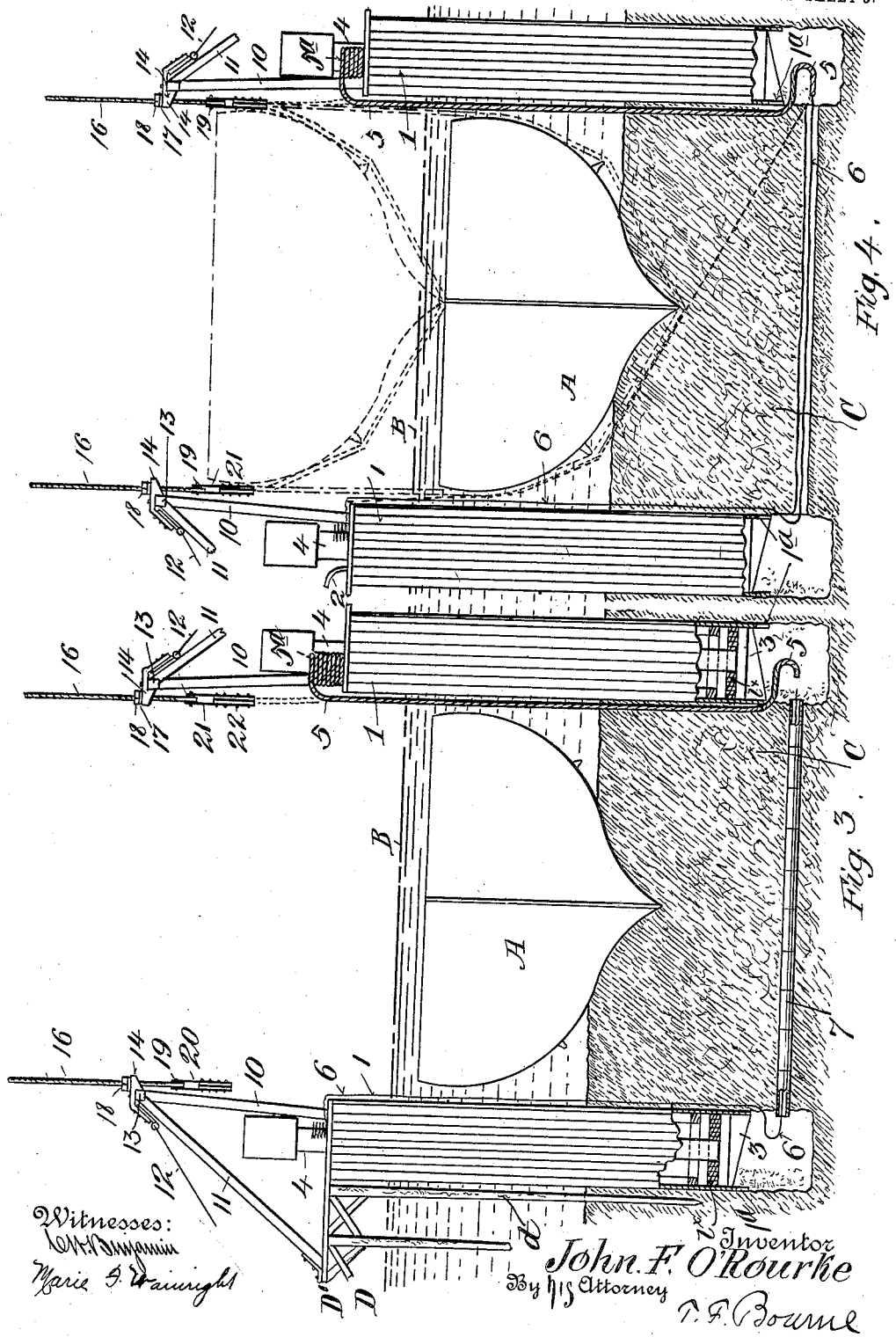

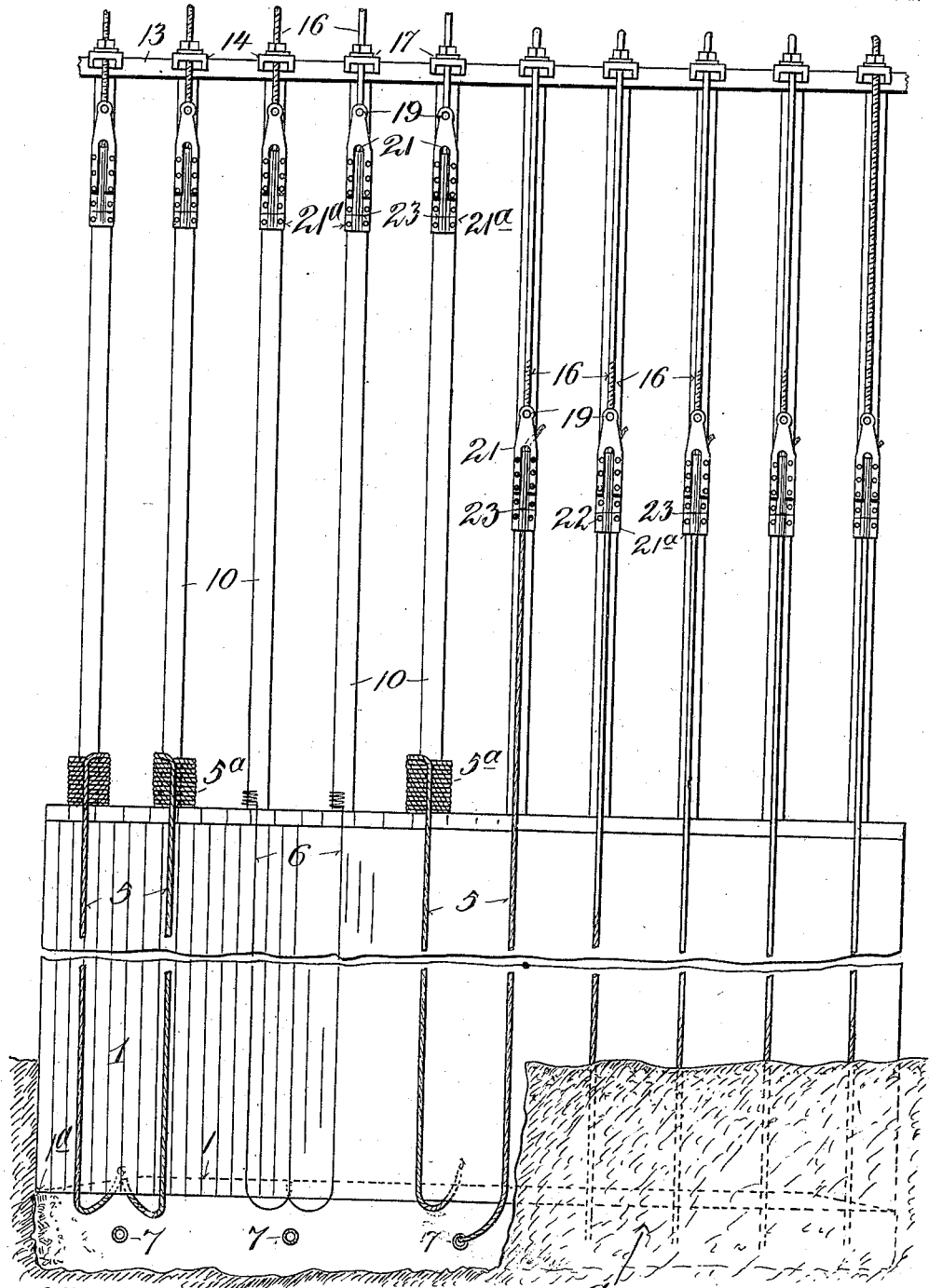

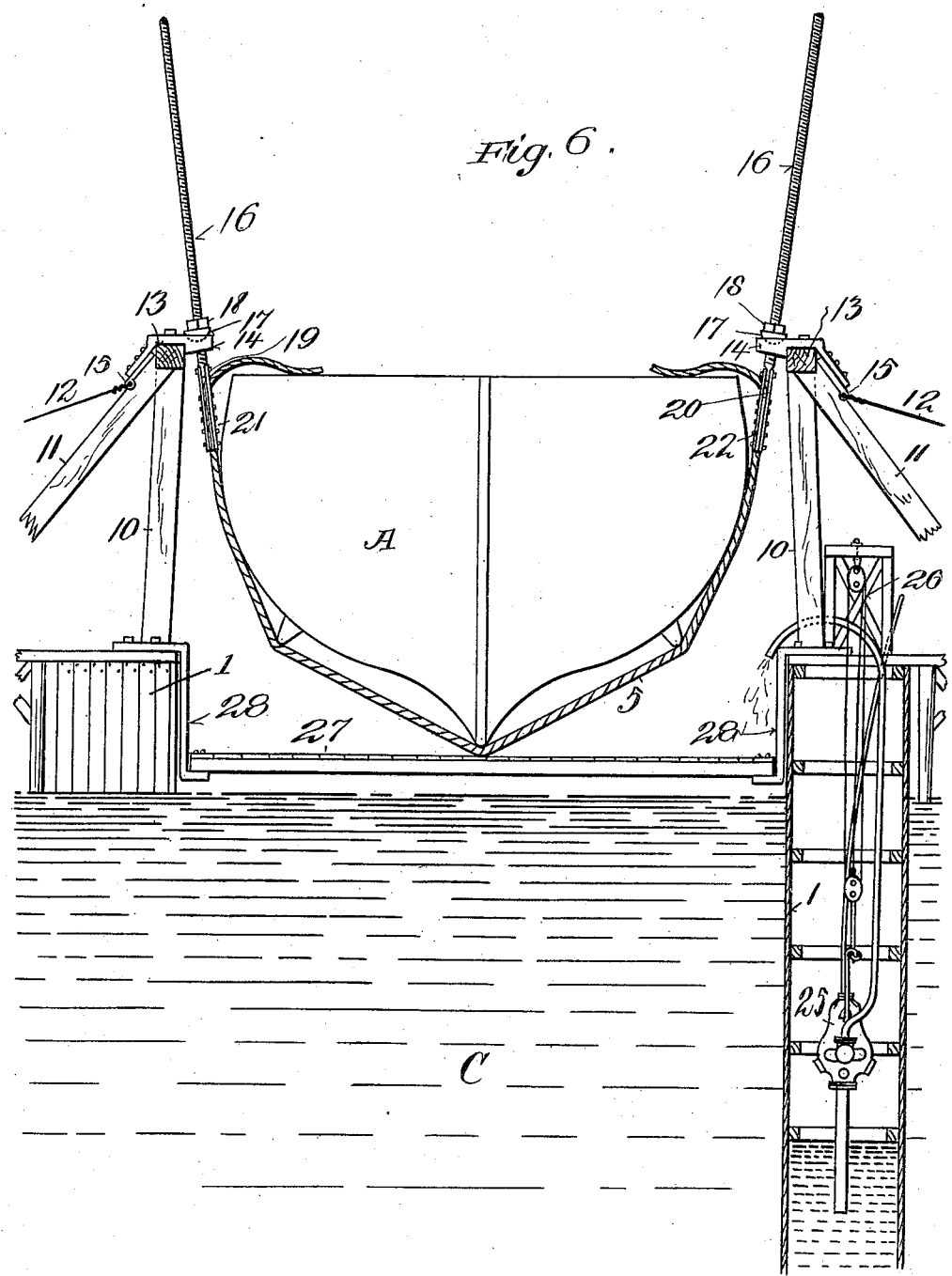

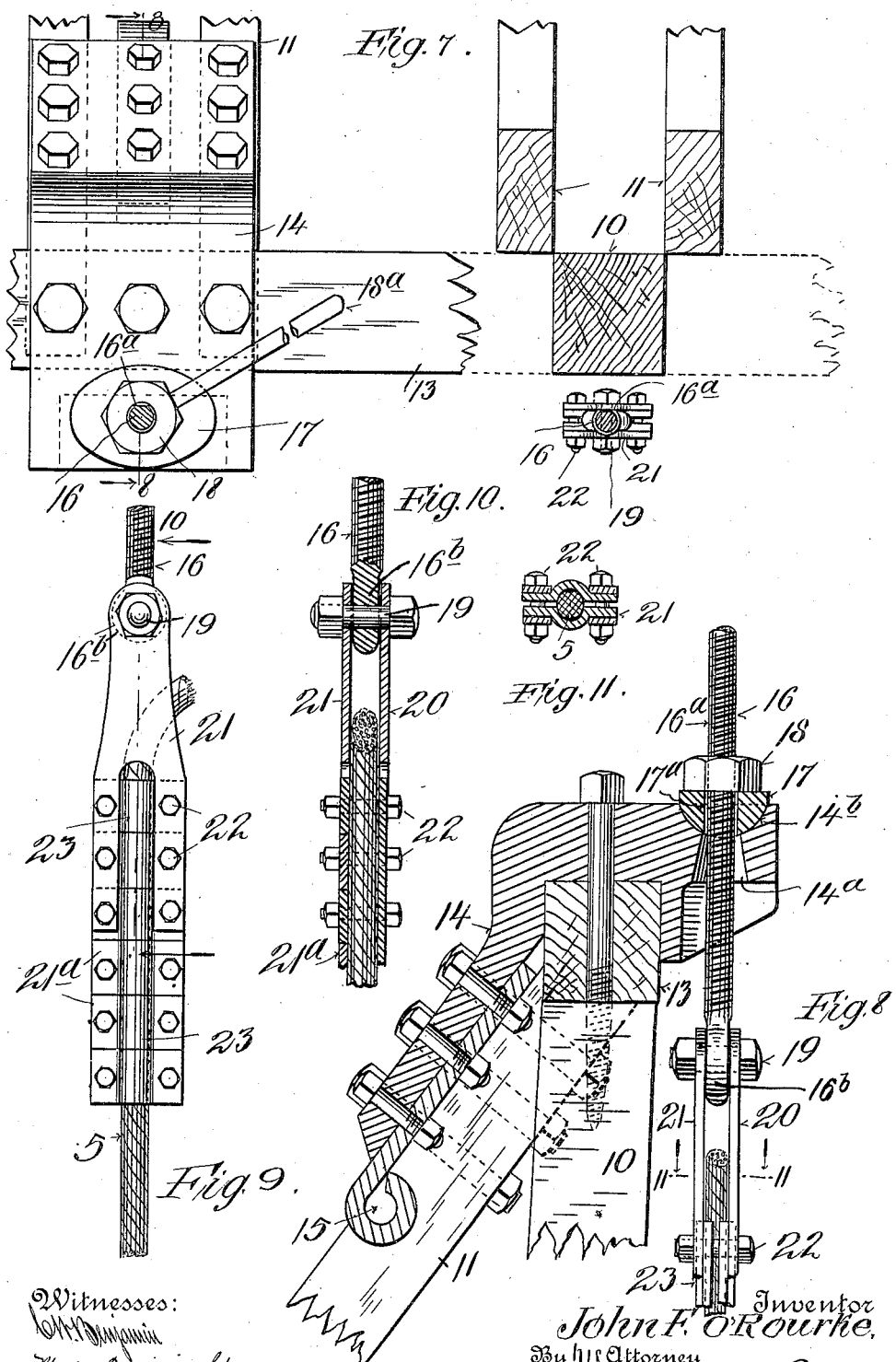

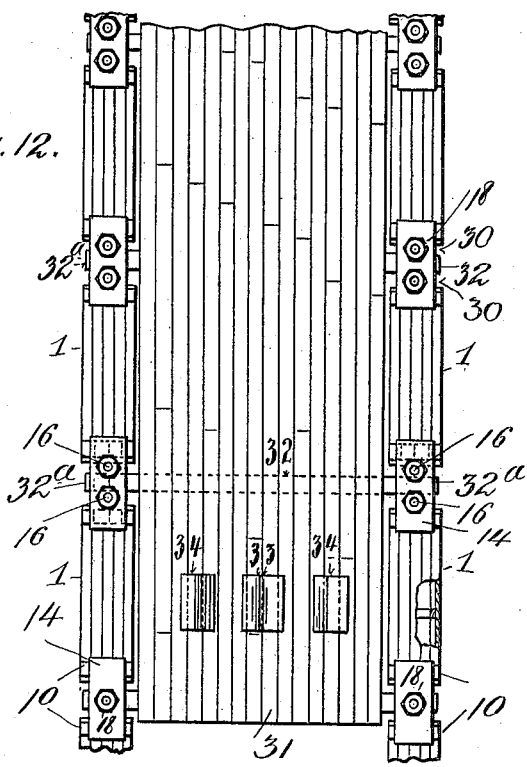
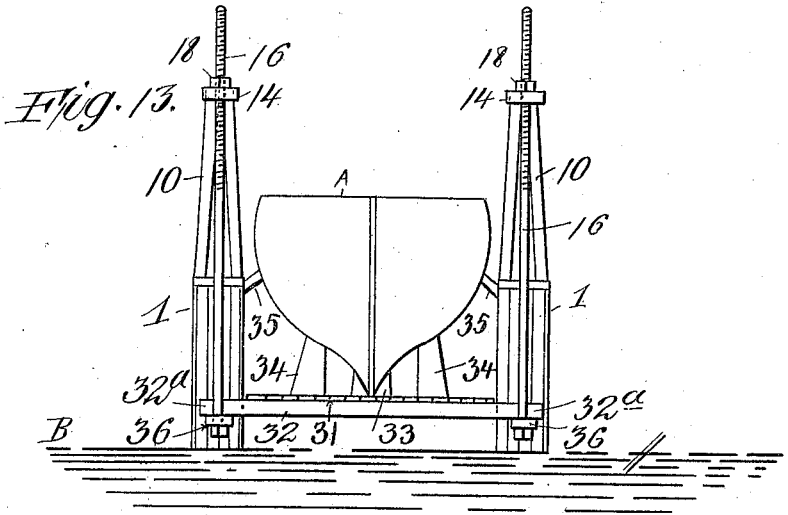

UNITED STATES PATENT OFFICE.

JOHN F. O'ROURKE, OF NEW YORK, N. Y.

METHOD OF AND MEANS FOR RAISING OR REPAIRING VESSELS.

988,136.  Specification of Letters Patent.  Patented Mar. 28, 1911.

Application filed July 20, 1910. Serial No. 572,875.

*To all whom it may concern:*

Be it known that I, JOHN F. O'ROURKE, a citizen of the United States, and resident of New York city, borough of Manhattan, in the county of New York and State of New York, have invented certain new and useful Improvements in Methods of and Means for Raising or Repairing Vessels, of which the following is a specification.

The object of my invention is to enable sunken vessels to be raised from beneath the water and whereby they may be sustained above the surface of the water while being repaired or put in condition to be floated, my invention being equally applicable to raising floating vessels from the water, in the general nature of a dry dock, to enable them to be repaired, painted and the like.

In carrying out my invention I sink to a suitable depth in the bottom of the sea, river or the like, a suitable number of caissons properly spaced apart, either on opposite sides of a sunken vessel, or in proper position for a vessel to be floated between such caissons, and I equip said caissons with means for passing cables beneath the vessel and for raising said cables to lift the vessel upwardly within or above the water, whereby the vessel may be suspended upon such cables while being repaired, painted or otherwise treated.

In a preferred form of my invention, where I desire to raise a sunken vessel, I build suitable docks on opposite sides of the vessel, and between the docks and the vessel I sink caissons into the bed of the sea, river or the like, providing said caissons with air chambers at the lower ends, and with suitable air locks and pipes in suitable or customary manner of sinking caissons, and I provide said caissons with suitable uprights or stays having means for raising cables. In order to conveniently apply the cables beneath the sunken vessel I carry the cables along the outer sides of the caissons adjacent the sides of the vessel, fitting the lower ends of the cables within the lower air chambers, the upper portions of the cables being maintained above the caissons. After the caissons have been sunk to the required depth and the workmen have established working chambers beneath the caissons, means, such as rods or tubes are forced through the mud, earth or ground from the working chambers under the caissons on one side of the vessel to the working chambers under the caissons on the opposite side of the vessel, and by said means the workmen pull the lower free ends of certain of the cables, (meanwhile removing the tubes from said cables as the work progresses), the ends of the cables then being raised on corresponding sides between the caissons and the vessel. The ends of the cables are then attached to suitable hoisting devices above the caissons, and when the cables are all properly thus fitted across beneath the vessel, the cables may be lifted to raise the vessel through or above the water. While the vessel is thus suspended, a platform may be built beneath the vessel above the surface of the water upon which the workmen may stand in repairing the vessel, so that the same may thereafter be lowered into the water and floated away.

My invention also comprises novel details of improvement and combinations of parts that will be more fully hereinafter set forth and then pointed out in the claims.

Reference is to be had to the accompanying drawings forming part hereof, wherein, Figure 1 is a partly broken plan view, parts being omitted, illustrating my improvements; Fig. 2 is an end view of Fig. 1, partly in section on the plane of the line 2, 2, in Fig. 1; Fig. 3 is a partly broken end view illustrating the manner of passing the cables beneath the sunken vessel; Fig. 4 is a substantially similar view showing a further step in applying the cables beneath the vessel; Fig. 5 is a partly broken side elevation illustrating different steps in the work of applying the cables beneath the vessel; Fig. 6 is a partly sectional view illustrating the vessel raised and suspended upon the caissons; Fig. 7 is a partly sectional detail plan view of the means for supporting and raising the cables; Fig. 8 is a section on the line 8, 8, in Fig. 7; Fig. 9 is a side view of the clamp for gripping the cable; Fig. 10 is a section on the line 10, in Fig. 9; Fig. 11 is a section on the line 11, 11, in Fig. 8; Fig. 12 is a plan view of a dock adapted to receive floating vessels, and Fig. 13 is an end elevation thereof.

Similar numerals and letters of reference indicate corresponding parts in the several views.

In the drawings the letter A indicates a vessel, shown submerged beneath the surface of the sea B and partially in the mud or other bottom C, it being presumed that the vessel has sunk.

At D, on opposite sides of the vessel, docks are indicated, which may be built at suitable distances from the sides of the vessel, by means of piles $d$, driven into the bottom in customary manner, and decked over by boards D', in ordinary manner. Between the sides of vessel A and the adjacent docks I sink caissons 1 into the bottom to a suitable depth. Said docks protect the caissons from the action of the waves. Said caissons may be formed in any suitable or well known manner, as of planking properly braced, and said caissons are preferably oblong, and extend above the surface of the water for a suitable distance when finally located. The caissons 1 have the flooring $1^x$ near the bottom providing the working chamber 3 from which the working tubes 4 extend through and above the caissons and are provided with air-locks and pipes for maintaining compressed air in the working chambers 3 in usual or customary manner of sinking pneumatic caissons. In order to aid in sinking the caissons water may be filled into the same as required, and the caissons may be pushed down from the docks by weights, or in any other suitable manner. As the caissons are being set in place the workmen excavate the material of the bottom from beneath the caissons by working in chambers 3 and sending the material up through the working tubes 4, the compressed air within the chambers and excavations holding back the mud and water, as usual. When the caissons are to be sunk working cables 5 are suspended along the outer sides of the caissons adjacent the vessel, and the lower ends of said cables are pulled within chambers 3 below the cutting edges $1^a$ of the caissons, and are secured within chambers 3 as by hooks or the like at $a$, while the remaining parts $5^a$ of the cables are maintained upon the tops of the caissons or upon the dock. In addition to the working cables 5 I also provide smaller and more flexible cables 6 arranged similarly to the cables 5, having their lower ends carried outside the caissons and beneath the corresponding cutting edge $1^a$ of the caissons and secured within chambers 3, as upon the hooks or supports $a$. Cables 5 for one section of the work may be arranged along the outer wall of one caisson and the corresponding smaller cables 6 along the corresponding wall of the opposed caisson, or the cables 5 and 6 may alternate as desired along the sides of the corresponding caissons. By this means the free ends of the cables will be carried down as the caissons are sunk, and such ends of the cables will be in position to be manipulated by the workmen in the chambers 3.

After the caissons are sunk to the required depth the cables 5 are to be passed beneath the vessel and suspended between the corresponding opposed caissons to enable the cables to be drawn up to raise the vessel. In order to permit the cables to be so passed from one caisson to another beneath the vessel, through the bottom that lies beneath the vessel, the workmen in one excavation pass the cables therefrom through the bottom to the corresponding excavation under the opposite caisson, which may be done by forcing pipes, rods or other suitable connection. Such means may be in sections screwed together in well known manner. I have shown pipe 7 for the purpose. A wire or the like is pushed through such pipe from one excavation to the other, and the free end of a small cable 6 is attached to the wire and the latter then pulled back to the said excavation pulling such cable 6 with it (see Fig. 3), and when the free end of such cable 6 is in such excavation the pipe 7 is removed from such cable and retained within the chamber below the caisson, and the small cable 6 is then attached to one of the large cables 5, cable 6 passing through the bottom (see Fig. 4). The workmen on the caisson from which such small cable 6 depends then raise the small cable 6 and with it pull the attached large cable 5 through the bottom beneath and up along the side of the vessel opposite to the caisson from which the large cable depends, as illustrated in dotted lines in Fig. 4. Thus, each cable 5 is laid beneath the vessel, and such work can proceed from side to side until all the desired cables 5 have been looped under the vessel and hang suspended from the opposed caissons. The cables 5 are then pulled up by suitable means to lift the vessel bodily through or above the surface of the water, the downward thrust being borne by the caissons. For this purpose I have shown the following arrangement: Extending upwardly from the caissons are any desired number of studs 10 shown braced by stays 11 and guys 12 extending to the dock, and the upper ends of studs 10 are shown connected by beams 13, whereby said parts are all firmly braced. The parts 11 and 13 are shown firmly secured together by metal plates or blocks 14 to which the guys 12 may be attached by eyes 15, and in the construction illustrated said plates or blocks 14 may be utilized in raising and supporting cables 5. To this end I have shown the plates 14 extending beyond studs 10 and provided with vertically disposed holes $14^a$ receiving screws 16, the holes $14^a$ being shown downwardly flaring to permit play of screws 16. The screws are shown passing freely through openings in blocks 17 that are fitted to swing as required in seats or sockets $14^b$ in blocks 14 alining with holes $14^a$ (see Figs. 7 and 8), nuts 18, threaded upon screws 16, working upon blocks 17. Blocks 17 are shown substantially oval in plan and their under surfaces are in substantially ovoidal form, the seats or sockets 14ᵇ being substantially of the same ovoidal shape, whereby the blocks 17 may rock in said seats without rotating therein. The screws 16 are shown flattened along one side at 16ᵃ (see Fig. 7) or substantially in D-shape, and the openings 17ᵃ in blocks 17 have substantially the same shape so that the screws 16 will not rotate when nuts 18 are rotated. By this means, as nuts 18 are rotated screws 16 may be raised and lowered while maintaining a vertical motion without rotation. Nuts 18 may be rotated by a wrench, or may be provided with handles 18ᵃ for the purpose, see Fig 7. The lower ends of screws 16 are provided with eyes 16ᵇ receiving bolts 19, passing through clamp plates 20, 21, that clamp the cables 5 by means of bolts 22 passing through said plates. One of the plates, as 20, may extend the full length of the clamp and the plate 21 may be shorter and several plates 21ᵃ may be applied to the lower part of plate 20 for affording positive gripping of the cable. The plates 20, 21 and 21ᵃ are shown provided with offset or channel portions 23 to receive cable 5 to more firmly grip the cable.
After the caissons have been set in place along the sides of the vessel and the cables 5 have been passed beneath the vessel they will be properly secured in the clamps 20, 21 with the screws 16 suitably lowered, and then nuts 18 will be rotated to pull up the cables, whereby the vessel will be raised. As the cables 5 are thus pulled up and the corresponding screws 16 have been raised as high as possible or desired, the clamps may be successively lowered along the cables by first releasing the clamps, then lowering the screws and then attaching the clamps again to the cables and restoring the tension, certain of the clamps and screws being lowered while other cables support the vessel, and so on, until new gripping positions have been effected for screws 16 along the cables, whereupon the latter will be again raised and so on, thus taking up the cables until the vessel is raised out of the water and suspended above the surface of the water, as illustrated in Fig. 6.

Beginning the operation of raising the vessel the cables are first tensioned, then the water filling the caissons may be pumped out of the latter to an amount something less than the weight of the vessel, all of which is soon to be imposed upon the caissons, whereby the weight of the vessel will be prevented from causing the caissons to sink unduly into the bottom. This removal of the water from the caissons may be effected by any suitable means, as by a pump. For this purpose I have shown a pulsometer 25 (see Fig. 6) within the caisson which may be lowered therein, as required, by means of tackle 26. While the vessel is being raised water may be pumped therefrom or drained through openings therein.

After the vessel has been raised from the surface of the water a platform 27 may be placed beneath the vessel between the caissons and supported upon hangers 28 suspended from the caissons (see Fig. 6), upon which platform or some suitable support workmen may repair the vessel, that is to say, may make sufficient repairs to enable the vessel to float, such as by replacing plates upon the vessel, etc., or she may be completely refitted, if desired.

While I have described my improvements as adapted to be built around a sunken vessel for the purpose of raising the same, whereby the vessel may be there repaired and again floated by lowering the cables, which may be done by reversing the described operation of taking up the cables, it will be understood that my improvements may be built in desired position to serve in the nature of a dry dock. In such case the docks and caissons will be erected in the desired position, the cables or means connected therewith may be lowered between the caissons when a vessel is to be floated between the caissons, then the cables may be drawn up in the manner described to raise the vessel out of the water, or a platform may be placed in position beneath the vessel, and the latter may be repaired, scraped, painted and the like, and then again lowered into the water. In either case, if any of the cables should be located over the place to be repaired, it will be understood that such cables that are an obstruction may be loosened and set aside temporarily or moved to new positions, while the other cables sustain the vessel.

In Figs. 12 and 13 I have illustrated my improvements as particularly adapted for raising floating vessels. In this case the docks may, if desired, be dispensed with, and the caissons 1 set in the bed of the water as before stated, and the caissons of each series may be separated a suitable distance apart, as indicated at 30. Between the caissons a movable platform 31 is provided and said platform has transversely disposed braces or beams 32, the end portions 32ᵃ of which project beyond the platform into the spaces 30, whereby the platform is guided and maintained in position. The uprights 10 are erected upon the caissons in suitable manner at the ends thereof, and the screws 16 depend therefrom, and are connected with platform 31 by any suitable means, as by blocks 36, the screws being supported and operated in any desired manner or as before set forth. Upon platform 31 may be provided the customary guides 33 for the keel of the vessel, and the bilge blocks 34 which may be set in any suitable position. Platform 31 may be lowered beneath the surface of the water, the vessel may then be floated over the platform between the caissons 1, and the platform may be raised to lift the vessel above the water. Blocks 33 and 34 may be set in proper position before platform 31 is lowered to accord with the lines of any given vessel. When the vessel is raised it may be braced against the caissons by suitable braces 35 in any well known manner.

By means of my invention caissons may be made to carry vessels on insecure bottoms without imposing their weight upon the bottom by reason of the removal of an equivalent weight of water from the caissons or the weight imposed upon the bottom by the vessel when suspended upon the caissons may be limited as desired.

My improvements are not limited to the details of construction set forth, as the same may be varied, within the scope of the appended claims, without departing from the spirit of my invention. For instance, chains may be substituted for the cables, and means such as a platform may be attached to the cables or chains to bear under the vessel.

Having now described my invention what I claim is:

1. The method of raising vessels consisting in erecting supports in the bed of water upon opposite sides of a vessel, passing flexible connections through the bottom beneath the vessel from one of such supports to the other, lifting said connections upon said supports to raise the vessel, and sustaining said vessel upon said connections.

2. The method of raising vessels consisting in erecting supports in the bed of the water on opposite sides of a vessel, passing pipes through the bottom beneath the vessel from one support to the other, drawing cables through said pipes from one support to a chamber beneath the opposite support, removing the pipes from said cables, attaching other cables to the first named cables, pulling the second named cables through the bottom beneath the vessel, and raising opposite ends of said cables to sustain said cables upon said supports.

3. The method of raising vessels consisting in erecting caissons on opposite sides of a sunken vessel, charging said caissons with water, passing flexible connections beneath the vessel from said caissons, lifting said connections to raise the vessel, and discharging water from the caissons to counteract the effect of the weight of the vessel upon the caissons.

4. The method of raising vessels consisting in sinking caissons into the bottom on opposite sides of the vessel, excavating chambers beneath the caissons, charging said caissons with water, passing cables through the bottom from one excavation to another beneath the vessel, lifting said cables from said excavations to raise the vessel, and discharging water from said caissons to counteract the effect of the weight of the vessel upon the caissons.

5. The method of raising vessels consisting in erecting caissons at a distance apart, suspending flexible connections within the water between said caissons, lifting said connections to raise a vessel, supported by said connections, and counteracting the effect of the weight of the vessel upon said caissons.

6. The method of raising vessels consisting in erecting caissons at a distance apart, charging said caissons with water, suspending flexible connections within the water between said caissons to raise a vessel supported by said connections, and discharging water from said caissons to counteract the effect of the weight of the vessel upon said caissons.

7. The combination of caissons spaced apart and having their lower ends in the bottom beneath the water, and provided with chambers at their lower ends, cables depending along the opposed walls of said caissons and having their lower ends within said chambers, connections passing through the bottom and communicating with opposed chambers, and means upon the caissons for raising the cables upwardly between the caissons.

8. The combination of caissons spaced apart, flexible connections upon the caissons extending along opposed outer walls thereof and beneath the lower corresponding cutting edges of the caissons, the free ends of said connections being retained within the lower chambers of the caissons, and means upon the caissons to raise the ends of said connections passing from opposed caissons.

9. The combination of docks spaced apart, caissons located along the opposed sides of said docks, means to permit flexible connections to be passed in loop-like form between the caissons, and means upon the caissons for raising the end portions of said connections suspended between the docks.

10. The combination of opposed caissons spaced apart, uprights upon the caissons, screws supported by said uprights, means to raise said screws, and means to connect said screws with opposite end portions of flexible connections suspended between the caissons.

11. The combination of opposed caissons spaced apart, uprights upon the caissons, supporting blocks upon the uprights, screws passing through the blocks, nuts upon the screws for raising and lowering the latter, and clamps carried by said screws for engaging flexible connections hung between the caissons.

12. The combination of opposed caissons spaced apart, uprights upon the caissons, supporting blocks upon the uprights provided with seats, blocks within said seats, means to prevent rotation of the blocks, screws passing through said blocks, nuts upon the screws operating upon the movable blocks, and means for connecting cables with said screws to support the cables between the caissons from the opposed screws.

13. The combination of opposed caissons spaced apart, uprights upon the caissons, supporting blocks upon the uprights provided with ovoidal seats, blocks having ovodial surfaces fitting said seats, screws passing through said blocks, nuts upon the screws, and means to detachably connect said screws with cables hung between the caissons.

14. The combination of opposed caissons spaced apart, uprights upon the caissons, supporting blocks upon the uprights provided with ovoidal seats, blocks having ovoidal surfaces fitting said seats, screws passing through said blocks, nuts upon the screws, means to prevent rotation of the screws within said blocks, and means to detachably connect said screws with cables hung between the caissons.

Signed at New York city, in the county of New York, and State of New York, this 15th day of July, A. D. 1910.

JOHN F. O'ROURKE.

Witnesses:
T. F. BOURNE,
RALPH H. RAPHAEL.

---

Copies of this patent may be obtained for five cents each, by addressing the "Commissioner of Patents, Washington, D. C."